Figure 1:
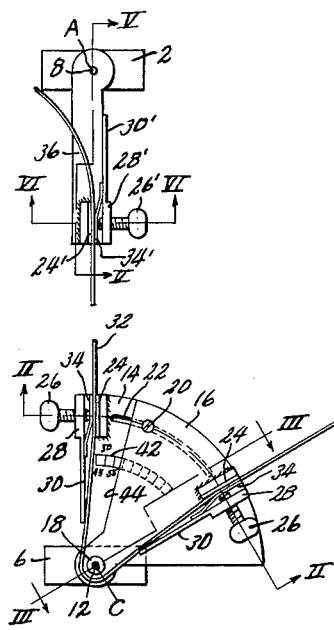
Figure 1:
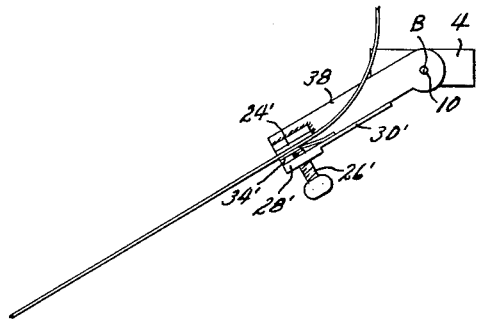

Dec. 4, 1962 R. D. GUTTING 3,066,416
DEVICE FOR LAYING OUT CORNERS
Filed Dec. 5, 1960

INVENTOR.
Robert D. Gutting
BY John A. Hamilton
Attorney.

United States Patent Office 3,066,416
Patented Dec. 4, 1962

3,066,416
DEVICE FOR LAYING OUT CORNERS
Robert D. Gutting, 832 W. 35th St., Topeka, Kans.
Filed Dec. 5, 1960, Ser. No. 73,925
9 Claims. (Cl. 33—1)

This invention relates to new and useful improvements in devices for laying out corners. It has been conceived primarily as an aid for builders in laying out the corners and wall lines of a house or other building, preparatory to commencing the basement excavation or other construction work. It will, however, be apparent that the device has adaptability for laying out corners generally, and accurately determining the angles thereof.

The front wall line of a house may be easily determined by measuring a predetermined setback from the front property line. The ends of said line are commonly marked by stakes driven into the ground, and more precisely by nails driven into the tops of said stakes, and the line itself is marked by a cord or line stretched between and affixed to said nails. However, difficulty is often experienced in establishing the side wall lines of the house accurately at right angles from the ends of said front wall line. One method involves setting up a transit over each end of the front wall line, accurately measuring a right angle with the transit, then measuring off the length of the side wall. This method is obviously time-consuming, and requires at least two men. Another method is to tie a cord to the stake nail at each end of the front wall, measuring said cords to the length of the side wall lines, positioning said cords by eye as nearly as possible at right angles to the front wall line, and setting the distance between the free ends of the cords equal to the length of the front wall line. Cords are then stretched diagonally across the rectangle thus established. If the diagonals are of precisely equal length, the corners are at right angles. If the diagonals are not equal, the process must be repeated. This process is also obviously time-consuming, inefficient, subject to various known errors, and usually requires two or more men.

The principal object of the present invention is, therefore, the provision of a device whereby the corners of a house or the like may be laid out quickly, easily and with extreme accuracy by a single man without assistance.

Other objects are simplicity and economy of construction, efficiency and dependability of operation, and adaptability for use in a wide variety of applications.

Figure 2:
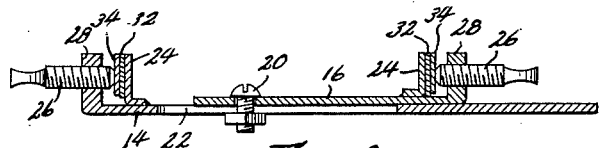
Figure 3:
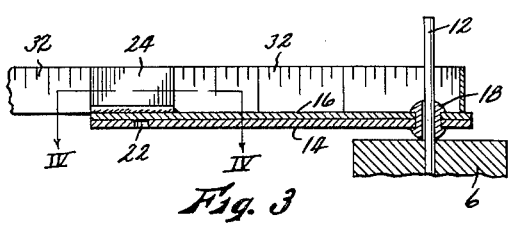
Figure 4:
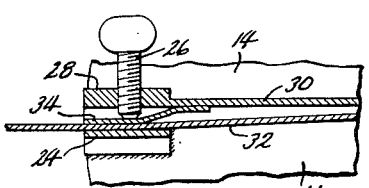
Figure 5:
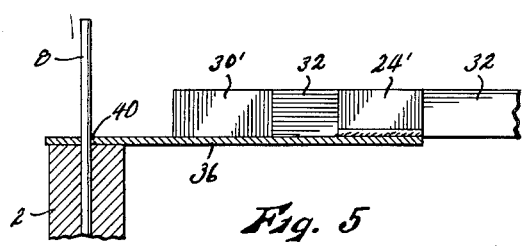
Figure 6:
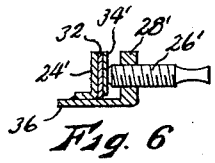

With these objects in view, as well as other objects which will appear in the course of the specification, reference will be had to the drawing wherein:

FIG. 1 is a top plan view, partially broken away and foreshortened, of a device embodying the present invention, shown in operative disposition, FIGS. 2 and 3 are enlarged sectional views taken respectively on lines II—II and III—III of FIG. 1, FIG. 4 is a fragmentary sectional view taken on lines IV—IV of FIG. 3, and FIGS. 5 and 6 are enlarged sectional views taken respectively on lines V—V and VI—VI of FIG. 1.

Like reference characters apply to similar parts throughout the several views, and the letters A, B and C designate a triangle defined, for example, by stakes 2, 4 and 6 driven into the ground, and more exactly defined by nails 8, 10 and 12 driven into the upper ends of said stakes. The side AB of the triangle may represent, for example, the front wall line of a house or other structure to be built and is predetermined and marked by stakes 2 and 4 by measurement from the property line or other available references. The side AC of the triangle may represent a side wall line of the structure.

The rapid and accurate placement of stake 6 and nail 12, so that the angle BAC will be precisely a right angle, or any other desired angle, is the function of the device forming the subject matter of this invention.

The device includes a pair of arms 14 and 16 formed of sheet metal, being disposed in overlapping relation and being pivotally joined together by any suitable means such as tubular rivet 18. Said arms extend substantially radially from said rivet, and are segmentally shaped. A bolt 20 extends through arm 16 and through an arcuate slot 22 formed in arm 14 concentrically with rivet 18. Said bolt guides and limits the relative movement of the two arms, but does not prevent relative pivotal movement thereof. A clamp is carried by each of said arms. Said clamp comprises a back plate 24 welded to said arm and rising vertically therefrom and a thumbscrew 26 disposed at right angles to plate 24 and threaded in a thickened portion 28 of a flange 30 formed by an upturned edge portion of the associated arm 14 or 16. Plate 24 and flange 30 of each clamp are spaced apart so as to receive a flexible steel tape 32 therebetween, said tape being urged against back plate 24 by screw 26 to secure it in place. Said tape may be an ordinary steel measuring tape, and is preferably graduated in feet and inches, as indicated in FIG. 3. As shown in FIG. 1, the tape is engaged in both of the clamps of arms 14 and 16, and each clamp is so disposed that the portion of the tape engaged therein is disposed radially to the axis of rivet 18. In order to prevent screws 26 from indenting or otherwise marring the tape, a leaf spring 34 is affixed to arm flange 30 adjacent each of said screws, and has its free end portion overlapping the inner end of the screw. The screw thus forces the spring against the tape, and the tape is gripped between the spring and back plate 24.

The pivoted arms 14 and 16 are affixed to tape 32 intermediate the ends thereof, and the device also may include a pair of separate arms 36 and 38 adapted to be affixed to the tape respectively in opposite directions from arms 14—16. Each of arms 36 and 38 comprises a planar length of sheet metal having a hole 40 (see FIG. 5) formed therethrough adjacent its one end whereby it may be engaged pivotally on nails 8 or 10, and having a clamp at its opposite end. Said clamp is similar in all respects to the clamps carried by arms 14 and 16, corresponding parts thereof being designated by corresponding primed numerals, and is operable to clamp tape 32 in a line radial to the axis of hole 40.

The usage of the device is substantially as follows: Assuming that stakes 2 and 4, and nails 8 and 10 thereof, have previously been positioned, and that it is desired to determine side wall line AC at right angles to line AB by the proper placement of stake 6 and nail 12, the tape 32 is clamped adjacent one end to arm 38, and hole 40 of said arm is engaged on nail 10. Then, since the desired lengths of lines AB and AC are known from the building plans, and since it is desired that angle BAC be a right angle, the length of line BC may be computed simply from the formula $BC = \sqrt{AB^2 + AC^2}$. This computation may be still further simplified by the provision of a printed table of squares, computed in feet, inches, and fractions of inches, said table to be furnished as an accessory with the mechanical parts of the device. The tape is then clamped in arm 16 of the device, so that the distance between hole 40 of arm 38 and the axis of rivet 18 equals the computed length of line BC. To compensate for the lengths of the arms themselves, it is desirable that the outer edges of the clamps be disposed at a known distance from the pivotal axes of the arms, for example four inches. The tape graduations may then be read to the outer edge of the clamp, allowing four inches at each end for the length of the arms themselves. The tape is then curved and clamped in arm 14 as shown, and arm 36 is clamped to the extended portion of the tape so that the length of the tape between the clamps of arms 14 and 36, plus the lengths of the arms themselves, equals the known length of line AC. Arms 36 and 38 are then pivotally engaged respectively on nails 8 and 10, and arms 14 and 16 are carried away from stakes 2 and 4 until both reaches of the tape are taut. The axis of rivet 18 then defines point C. Stake 6 may then be driven into the ground, and nail 12 driven into the stake through the hollow axis of rivet 18, with both reaches of the tape still taut. It is preferable that all of the nails 8, 10 and 12 be headless, in order that the various arms may be lifted off of said nails without disturbing them. The line AC has therefore been laid out very accurately to the desired length, and at precisely right angles to line AB, as desired. As a check on the accuracy of the operation, the table of squares may also give the angle ACB in each computation, and this angle may be read by means of a protractor scale 42 printed on the upper surface of arm 14 and readable in conjunction with an edge 44 of arm 16. The device is extremely accurate and reliable in operation, permits the laying out of corners in a fraction of the time required by previous methods, and requires only a single person to operate it. Also, it is easily adaptable to lay out corners not only at right angles, but at any other desired angularity, since in any triangle of which two sides and the included angle are known, the length of the third side may be computed. While the computation becomes somewhat more complicated when the included angle is not a right angle, such computations may be greatly simplified by means of mathematical tables such as those already discussed.

While I have shown and described a specific embodiment of my invention, it will be readily apparent that many minor changes of structure and operation could be made without departing from the spirit of the invention as defined by the scope of the appended claims.

What I claim as new and desire to protect by Letters is:

1. A device for laying out corners comprising a pair of arms, means pivotally connecting said arms together for relative movement about an axis transverse to their longitudinal extent, clamp means carried by each of said arms in spaced relation from the pivotal axis thereof, and a flexible tape adapted to be engaged in each of said clamp means and to extend from the associated arm in a direction radial to the pivotal axis of said arms.

2. A device as recited in claim 1 wherein said tape is graduated longitudinally in the manner of a measuring tape.

3. A device as recited in claim 1 wherein said tape is graduated longitudinally in the manner of a measuring tape, and wherein said clamp means permit longitudinal adjustment of said tape relative to said arms.

4. A device as recited in claim 1 wherein said means pivotally connecting said arms constitutes a pivot pin having an opening formed therethrough concentrically with the pivotal axis determined thereby.

5. A device as recited in claim 1 wherein one of said arms has a protractor scale imprinted thereon readable in conjunction with a reference portion of the other of said arms, whereby to indicate the angle between said arms.

6. A device as recited in claim 1 with the addition of a pair of individual arms, each of said individual arms having clamp means whereby it may be attached to a reach of said tape extending from one of said pivoted arms, and also having means whereby it may be mounted for pivotal movement about an axis transverse to itself and spaced apart from the clamp means carried thereby.

7. A device as recited in claim 6 wherein the clamp means of each of said individual arms is operable to engage said tape so that said tape extends from said individual arm in a direction radial to the pivotal axis of said individual arm.

8. A device as recited in claim 6 wherein the clamp means of each of said individual arms is operable to engage said tape so that said tape extends from said individual arm in a direction radial to the pivotal axis of said individual arm, and is operable to permit longitudinal adjustment of said tape relative to said individual arm.

9. A device as recited in claim 6 wherein the clamp means of each of said individual arms is operable to engage said tape so that said tape extends from said individual arm in a direction radial to the pivotal axis of said individual arm, and is operable to permit longitudinal adjustment of said tape relative to said individual arm, and wherein said tape is longitudinally graduated in the manner of a measuring tape.

No references cited.